Figure 7:
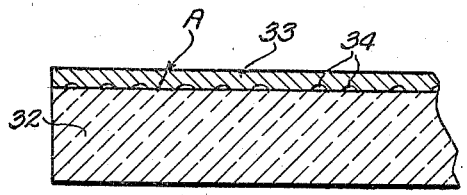

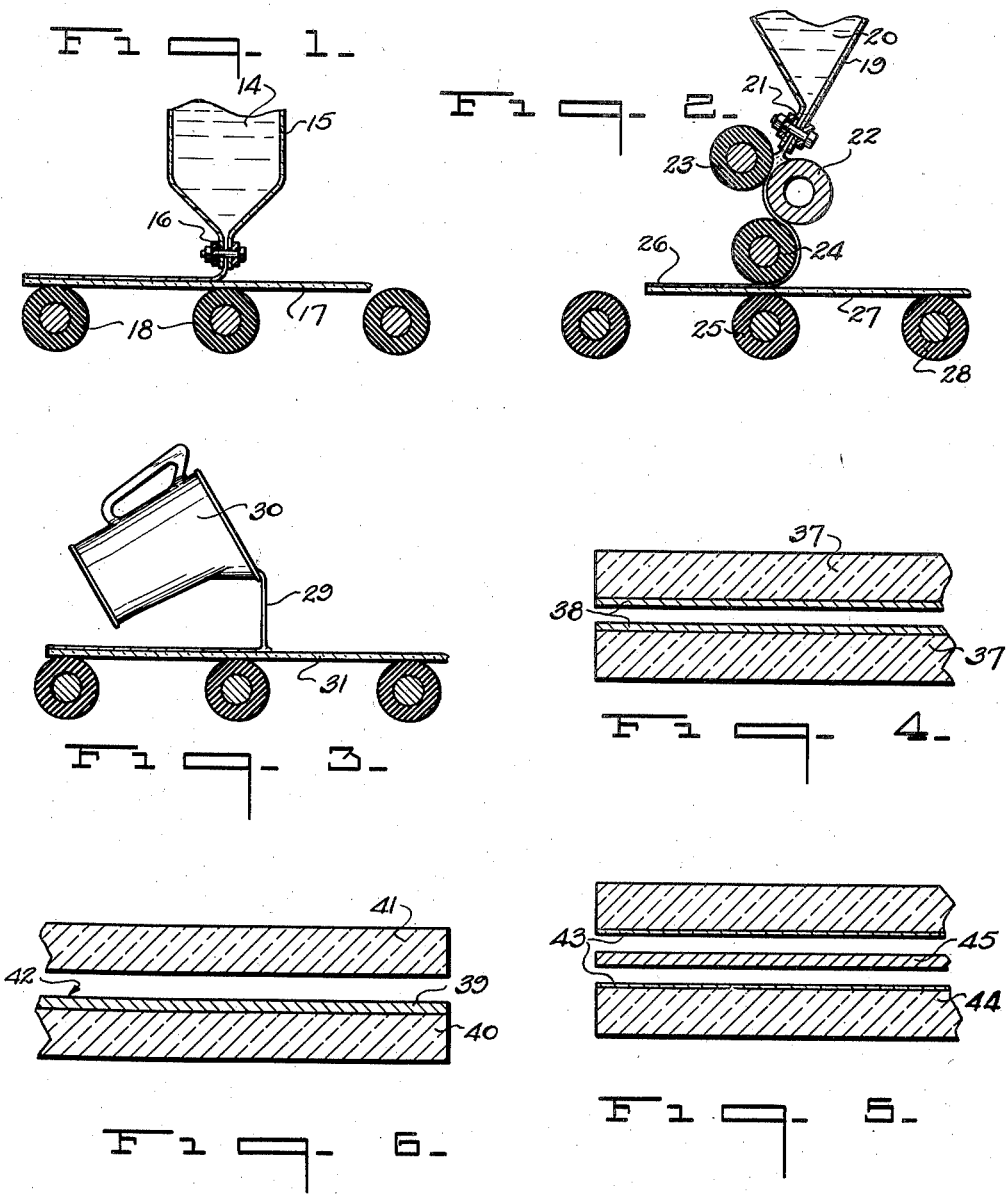

March 25, 1941.    G. B. WATKINS    2,236,046
LAMINATED SAFETY GLASS
Filed Oct. 16, 1933    2 Sheets-Sheet 2

Inventor
GEORGE B. WATKINS.
By Frank Fraser
Attorney

Patented Mar. 25, 1941

2,236,046

UNITED STATES PATENT OFFICE 2,236,046

LAMINATED SAFETY GLASS

George B. Watkins, Toledo, Ohio, assignor to Libbey-Owens-Ford Glass Company, Toledo, Ohio, a corporation of Ohio Application October 16, 1933, Serial No. 693,804

3 Claims. (Cl. 49—81)

The present invention relates to laminated safety glass and to the process of producing the same. Heretofore, it has been customary to make laminated safety glass by bonding a preformed sheet of transparent plastic material between two sheets of glass. Pyroxylin plastic and cellulose acetate plastic sheeting have been the usual materials employed as the intermediate plastic layer and before using such material, it has been customary to season the same as is well understood in the art.

The present invention pertains particularly to a process wherein the plastic portion of the safety glass is "flowed" onto the glass which is in contradistinction to the employment of a preformed sheet. The expression "flowed" is used to define the depositing of a mass, layer, or film of the plastic material upon the glass sheets even though the material be applied in sheet form, the distinction being that the plastic material is applied directly to the glass instead of being formed into sheets and seasoned as heretofore.

Where preformed sheet stock is used, the plastic mass is formed to the desired predetermined size, and the volatile solvents, etc. are eliminated by proper seasoning before the plastic is associated with the glass sheets. In accordance with the present invention, preformed sheets of this character are not used and by reason of the fact that the material is flowed directly upon the glass, with some types of plastics it may be desirable to eliminate solvent from the plastic layer after it has been placed upon one sheet of glass and before the second sheet of glass is placed in position.

I have found that the relative temperature of the glass at the time the plastic material is "flowed" thereon plays a very important part in the results obtained.

Broadly speaking, my invention is based on the proposition of controlling the temperature of the glass so it will be lower than that of the surrounding atmosphere and also that of the plastic material being deposited thereon. By so controlling the temperature of the glass at this time, the tendency toward vaporization within the plastic at or near the surface of the glass is eliminated, vaporization at these points causing "bubbles" and other defects to be formed in the plastic material. If the temperature of the glass is less than that of the surrounding atmosphere and the plastic material flowed upon the glass, vaporization takes place at the surface of the plastic layer remote from the glass. This is due to the fact that with the glass temperature lower as mentioned, a mild diffusion of the solvent or solvents through the plastic is permitted instead of promoting the more pronounced vaporization at the glass surface when the temperature is not so controlled.

Other objects and advantages of the invention will become more apparent during the course of the following description when taken in connection with the accompanying drawings.

Figure 8:
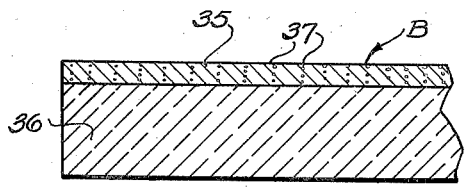
Figure 9:
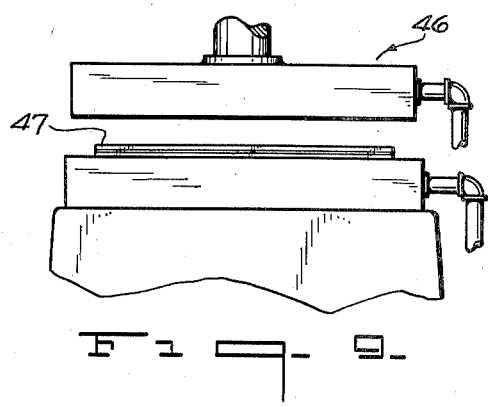
Figure 10:
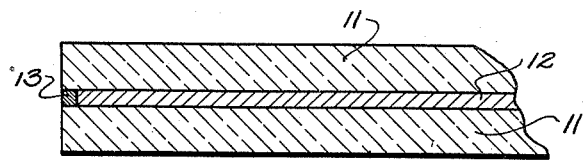

In the drawings wherein like numerals are employed to designate like parts throughout the same, Fig. 1 is a diagrammatic view illustrating the extrusion of a sheet of plastic material upon a sheet of glass, Fig. 2 is a diagrammatic illustration of a film machine adapted to deposit a layer or film of the plastic material upon the glass, Fig. 3 illustrates the process of pouring the plastic material upon the glass, Fig. 4 is a fragmentary vertical sectional view showing two sheets of glass each provided with a layer of plastic material adapted to be bonded together, Fig. 5 shows a modification wherein films of plastic material are formed upon the glass sheets and then subsequently united to a preformed sheet of plastic, Fig. 6 is a similar view showing all of the plastic material deposited upon one sheet of glass with a second sheet of glass in position to be applied to the outer exposed surface of the plastic layer, Fig. 7 is a fragmentary vertical section showing diagrammatically the effect of flowing a layer of plastic material upon a sheet of glass whose temperature is not properly controlled, Fig. 8 is a similar section showing diagrammatically the results obtained when the plastic is applied to the glass in accordance with the present invention, Fig. 9 is a diagrammatic representation of a form of pressing device that may be used, and Fig. 10 is a fragmentary sectional view of a finished sheet of laminated safety glass.

As shown in Fig. 10, the customary laminated safety glass comprises two sheets of transparent glass 11 between which is arranged a layer of plastic material 12 adherent to the inner surfaces of the glass sheets. The numeral 13 designates an edge seal formed of a weather-proof material disposed about the marginal portions of the safety glass to protect the inner lamination 12 and the bond between the laminations 11 and 12. The seal 13 can be applied or not, as desired, depending upon the particular type of plastic layer and bonding agent if such is used.

The present invention is not restricted to the use of any particular plastic material. By way of example, it is mentioned that cellulose acetate plastic, pyroxylin plastic, ethyl cellulosic plastic, or other cellulosic derivatives can be employed, or synthetic resins, such as the vinyl ester resins, acrylic acid ester resins, polyhydric alcohol polybasic acid resins, or the like, can likewise be used.

Regardless of the particular material selected for the central layer of the laminated safety glass, when applying the same to the glass, it is customary to include excess solvent, ordinarily a volatile solvent, to facilitate flowing so that a proper deposit of the material can be placed upon the glass. If such excess amounts of solvent or solvents are included in the plastic material, it is essential to eliminate at least the major portion thereof to give the proper mechanical strength, and also in the case where volatile solvents are employed to prevent subsequent bubbling or other deterioration of the plastic material when placed in service.

In Fig. 1, the mass of plastic material 14 is contained in a suitable hopper 15 and upon the application of the necessary pressure, the material can be extruded through the adjustable opening 16 upon the sheet of glass 17 disposed in a horizontal position and adapted to be carried past the opening 16 upon the roller conveyor 18.

In Fig. 2 another form of mechanism is illustrated wherein the hopper 19 contains the plastic material 20 which is permitted to flow through the adjustable opening 21 into the pocket formed between the rolls 22 and 23. With the device of Fig. 2, it is ordinarily necessary to employ a more fluid mass of plastic than with the extrusion device of Fig. 1. By positively rotating the rolls 22 and 23 and also the roll 24 arranged in opposition to the roll 25, a film of the plastic material 26 will be pressed upon the surface of the glass 27 carried horizontally on the roller conveyor 28. The thickness of film 26 deposited upon the glass can be controlled not only by the viscosity of the plastic mass 20, but also by the adjustment of the various rolls, particularly the adjustment of the rolls 24 and 25.

In Fig. 3, the plastic solution 29 is illustrated diagrammatically as being poured from the container 30 upon the glass sheet 31. Obviously, any preferred type of pouring device can be used in lieu of the particular receptacle illustrated.

Regardless of the apparatus used for applying the plastic material to the glass, the temperature of the glass sheet should be at least several degrees lower than that of the surrounding atmosphere and the plastic material being applied. As shown, the glass sheets in all cases are carried past the plastic applying device on a horizontal roller conveyor, although obviously the glass can be stationary during the flowing of the plastic, if desired. It is customary to thoroughly wash the glass sheets and after the customary washing, or in fact during the final stages thereof, the glass can be chilled to a temperature at least several degrees lower than the surrounding atmosphere. It is considered important to make sure that the temperature of the glass is substantially uniform throughout its thickness. Also, the roller conveyors can be employed to pass the glass through a pre-cooling chamber arranged in advance of the plastic depositing machine. In some cases, it may be possible to heat the plastic material slightly, this offering another possibility of making sure that the temperature of the plastic material will be slightly in excess of the temperature of the glass upon which the material is placed.

Fig. 7 is intended to show diagrammatically the effect when the temperature of the glass sheet 32 is not controlled in accordance with the present invention. As shown, a layer of plastic material 33 has been placed on the surface of the glass and due to an improper temperature relationship between the glass and plastic, vaporization has taken place at the contacting surfaces resulting in a bubbled condition 34. Naturally, the amount of solvent contained in the plastic mass as well as the character of the plastic and solvents involved will determine the exact character of the bubbled condition just referred to.

In Fig. 8 is illustrated diagrammatically what takes place when the temperature relationship between the plastic layer 35 and glass sheet 36 is properly controlled, namely, where the temperature of the glass is less, at least several degrees, than that of the surrounding atmosphere and plastic. It will of course be understood that the temperature of the glass is not so low as to cause condensation on its surfaces, and to positively guarantee against such a condition, the plastic applying machine can be arranged in a suitable compartment where the humidity of the atmosphere as well as its temperature can be accurately controlled. The numeral 37 is used to designate the diagrammatic showing of solvent diffusion through the plastic. While in the case of Fig. 7, vaporization takes place at the surface A, in Fig. 8, by a proper temperature control, vaporization of the solvent, so to speak, takes place at the surface B which is remote from the surface A shown in Fig. 7. The rate of diffusion through the plastic can be controlled by placing the sheet in a temperature controlled atmosphere. The amount of time required for treatment of the plastic layer after it has been placed on the glass will be dependent not only upon the particular plastic medium but also upon the type and amount of volatile solvent included in the original plastic mixture applied to the glass.

There are a number of ways in which the central plastic layer can be built up. In Fig. 4, each of the two sheets of glass 37 carries a layer 38 formed as above explained and, after proper treatment of the coated glass to permit of diffusion of solvent, the outer exposed surfaces of plastic on the two sheets of glass can be bonded together. Ordinarily, it is preferred to bring about bonding by the application of heat and pressure. Also with some types of plastic, it may be necessary to apply a slight amount of plasticizer or adhesive between the contacting plastic surfaces, while with other forms of plastic material the use of heat and/or pressure will be adequate to bring about satisfactory joining of the sheets.

In Fig. 6, the entire plastic lamination 39 has been formed on the sheet of glass 40 with the second sheet of glass 41 being uncoated and in position to be bonded to the surface 42 of the plastic.

A modification is shown in Fig. 5 wherein the layers 43 are formed on the glass sheets 44 with a preformed sheet of plastic 45 arranged therebetween.

There are various forms of pressing devices that can be used in the application of heat and pressure to the laminations. In Fig. 9 is shown diagrammatically a platen press 46 between the platens of which is the sandwich 47 comprising the glass sheets and interposed plastic material. Autoclaves, roller press devices, and other mechanism can likewise be used.

It will be understood that the amount and kind of solvent material permitted to remain in the finished glass will be such that the laminated safety glass will be stable to the heat and light energy to which the glass is subjected in the normal uses to which it is put in service.

I claim:

1. The process of producing laminated safety glass consisting in flowing a mass of plastic material containing excess solvent upon a sheet of glass whose temperature is lower than that of the plastic, then controlling the temperature of the glass and plastic material to cause escape of excess solvent from the plastic material without internal vaporization, and then uniting a second sheet of glass to the plastic layer so formed.

2. The process of producing laminated safety glass consisting in flowing a mass of plastic material containing an excess of solvent upon a sheet of glass whose temperature is at least several degrees lower than that of the plastic material and also lower than that of the surrounding atmosphere, then allowing sufficient time for the excess solvent to escape by diffusion, and then uniting a second sheet of glass to the exposed surface of the plastic layer so formed.

3. The process of producing laminated safety glass consisting in flowing a mass of plastic material containing an excess of solvent upon a sheet of glass, controlling the temperature of the plastic and glass so that the temperature of the glass will be at least several degrees lower than that of the plastic and maintaining this relationship to cause escape of excess solvent from the plastic by diffusion and in the absence of internal vaporization, and then finally uniting a second sheet of glass to the exposed surface of the plastic layer so formed.

GEORGE B. WATKINS.